United States Patent
Danielescu et al.

(10) Patent No.: US 12,142,263 B2
(45) Date of Patent: Nov. 12, 2024

(54) SELF-LEARNING NEUROMORPHIC ACOUSTIC MODEL FOR SPEECH RECOGNITION

(71) Applicant: Accenture Global Solutions Limited, Dublin (IE)

(72) Inventors: Lavinia Andreea Danielescu, San Francisco, CA (US); Timothy M. Shea, Merced, CA (US); Kenneth Michael Stewart, Irvine, CA (US); Noah Gideon Pacik-Nelson, Boston, MA (US); Eric Michael Gallo, Moretown, VT (US)

(73) Assignee: Accenture Global Solutions Limited, Dublin (IE)

( * ) Notice: Subject to any disclaimer, the term of this patent is extended or adjusted under 35 U.S.C. 154(b) by 264 days.

(21) Appl. No.: 17/946,523

(22) Filed: Sep. 16, 2022

(65) Prior Publication Data
US 2024/0096313 A1    Mar. 21, 2024

(51) Int. Cl.
| | |
|---|---|
| G10L 15/16 | (2006.01) |
| G10L 15/06 | (2013.01) |
| G10L 15/197 | (2013.01) |
| G10L 15/22 | (2006.01) |
| G10L 15/30 | (2013.01) |
| G10L 25/21 | (2013.01) |

(52) U.S. Cl.
CPC ............ G10L 15/16 (2013.01); G10L 15/063 (2013.01); G10L 15/197 (2013.01); G10L 15/22 (2013.01); G10L 15/30 (2013.01); G10L 25/21 (2013.01); G10L 2015/0635 (2013.01); G10L 2015/223 (2013.01)

(58) Field of Classification Search
CPC ..... G10L 15/16; G10L 15/063; G10L 15/197; G10L 15/22; G10L 15/30; G10L 25/21; G10L 2015/0635; G10L 2015/223; G10L 15/07; G10L 15/183
USPC .................................................................. 704/9
See application file for complete search history.

(56) References Cited

PUBLICATIONS

CNVRG.io [online], "Basic Guide to Spiking Neural Networks for Deep Learning," available on or before Jun. 3, 2021 via Internet Archive: Wayback Machine URL<https://web.archive.org/web/20210603120221/https://cnvrg.io/spiking-neural-networks/>, retrieved on Jul. 17, 2023, retrieved from URL<https://cnvrg.io/spiking-neural-networks/>, 18 pages.

(Continued)

*Primary Examiner* — Thierry L Pham
(74) *Attorney, Agent, or Firm* — Polsinelli P.C.

(57) ABSTRACT

Methods, systems, and apparatus, including computer programs encoded on computer storage media, for recognizing speech using a spiking neural network acoustic model implemented on a neuromorphic processor are described. In one aspect, a method includes receiving, a trained acoustic model implemented as a spiking neural network (SNN) on a neuromorphic processor of a client device, a set of feature coefficients that represent acoustic energy of input audio received from a microphone communicably coupled to the client device. The acoustic model is trained to predict speech sounds based on input feature coefficients. The acoustic model generates output data indicating predicted speech sounds corresponding to the set of feature coefficients that represent the input audio received from the microphone. The neuromorphic processor updates one or more parameters of the acoustic model using one or more learning rules and the predicted speech sounds of the output data.

20 Claims, 7 Drawing Sheets

(56) References Cited

PUBLICATIONS

HBR.org [online], "Voice Recognition Still Has Significant Race and Gender Biases," May 10, 2019, retrieved on Jul. 17, 2023, retrieved from URL<https://hbr.org/2019/05/voice-recognition-still-has-significant-race-and-gender-biases>, 6 pages.

Linkedin.com [online], "How brain-inspired technologies can support ethical AI," Apr. 29, 2021, retrieved on Jul. 17, 2023, retrieved from URL<https://www.linkedin.com/pulse/how-brain-inspired-technologies-can-support-ethical-ai-tim-shea/>, 8 pages.

MakingNoiseAndHearingThings.com [online], "Google's speech recognition has a gender bias," originally published Jul. 12, 2016, edited Jul. 2020, retrieved on Jul. 17, 2023, retrieved from URL<https://makingnoiseandhearingthings.com/2016/07/12/googles-speech-recognition-has-a-gender-bias/>, 6 pages.

Marini et al., "Optimising Speaker-Dependent Feature Extraction Parameters to Improve Automatic Speech Recognition Performance for People with Dysarthria," Sensors, Sep. 27, 2021, 21:6460, 16 pages.

NetworkWorld.com [online], "How edge computing makes voice assistants faster and more powerful," Mar. 9, 2018, retrieved on Jul. 17, 2023, retrieved from URL<https://www.networkworld.com/article/3262105/how-edge-computing-makes-voice-assistants-faster-and-more-powerful.html>, 4 pages.

Radzikowski et al., "Accent modification for speech recognition of non-native speakers using neural style transfer," EURASIP Journal on Audio, Speech, and Music Processing, Feb. 18, 2021, 2021:11, 10 pages.

Sensory.com [online], "Sensory: AI on the Edge & Beyond," available on or before Jan. 15, 2021 via Internet Archive: Wayback Machine URL<https://web.archive.org/web/20210115003402/https://www.sensory.com/> retrieved on Jul. 27, 2023, retrieved from URL<https://www.sensory.com/>, 8 pages.

Stanford.edu [online], "Stanford researchers find that automated speech recognition is more likely to misinterpret black speakers," Mar. 23, 2020, retrieved on Jul. 17, 2023, retrieved from URL<https://news.stanford.edu/2020/03/23/automated-speech-recognition-less-accurate-blacks/>, 4 pages.

Zhao et al., "A Unified Speaker Adaptation Approach for ASR," CoRR, submitted on Oct. 16, 2021, arXiv:2110.08545v1, 11 pages.

SELF-LEARNING NEUROMORPHIC ACOUSTIC MODEL FOR SPEECH RECOGNITION

FIELD

This specification generally relates to machine learning and speech recognition.

BACKGROUND

Speech recognition involves technologies for recognizing and translating spoken words into text. Speech recognition is used in many contexts, including speech-to-text processing and voice interfaces in which people interact with electronic devices using voice commands.

SUMMARY

This specification generally describes speech recognition systems and techniques that employ a neuromorphic processor that runs an acoustic model and enables the parameters of the acoustic model to be updated continuously based on one or more learning rules. An acoustic model represents relationships between audio signals and units of sound, e.g., phonemes. Self-learning acoustic models deployed on neuromorphic processors described in this document can achieve accurate speech recognition for user populations with different dialects, users who are under-represented in labelled speech datasets, and/or other user populations. The self-learning acoustic models can also achieve accurate speech recognition in changing or diverse noise environments. This can be advantageous in recognizing speech in situations in which there are contextual changes, e.g., as people tend to speak differently in different environments such as gyms or noisy rooms than they speak in quiet environments. This enables the speech recognition technology to serve a wider range of users without the required complexities of developing custom speech models for each region or user population.

One approach to recognizing speech in different dialects involves a custom acoustic model (and potentially custom lexicons and languages models as well) for each geographic region. This approach fails to account for much of the variation between speakers within the region, e.g., variations due to differences between the speakers in the region. Training acoustic models to account for all combinations of these factors would be infeasible, particularly as even defining categorical boundaries for the sociocultural influences on speech is nearly impossible. The computational costs of developing such acoustic models would be immense as each custom acoustic model requires data collection, testing, and maintenance. The self-learning acoustic models described in this document can learn to recognize speech of individual users and/or groups of users without the high computational costs required to train and maintain custom acoustic models.

According to some implementations, a method for recognizing speech can include receiving, a trained acoustic model implemented as a spiking neural network (SNN) on a neuromorphic processor of a client device, a set of feature coefficients that represent acoustic energy of input audio received from a microphone communicably coupled to the client device, wherein the acoustic model is trained to predict speech sounds based on input feature coefficients; generating, by the acoustic model, output data indicating predicted speech sounds corresponding to the set of feature coefficients that represent the input audio received from the microphone; updating, by the neuromorphic processor, one or more parameters of the acoustic model using one or more learning rules and the predicted speech sounds of the output data, wherein at least one learning rule is configured to update parameters of the acoustic model based on each speech recognition event for which the acoustic model generates a prediction of speech sounds; and initiating an action based on the output data. Other embodiments of this aspect include corresponding systems, apparatus, and computer programs, configured to perform the actions of the methods, encoded on computer storage devices.

These and other implementations can each optionally include one or more of the following features. In some aspects, initiating the action includes sending the output data to a cloud-based platform that includes a lexicon that is trained to output predicted words or phrases based on the predicted speech sounds, which are input into a language model trained to output predicted sentences or phrases, where the cloud-based platform determines the action based on the predicted sentences or phrases and causes the action to be performed.

In some aspects, at least one of the one or more learning rules is configured to update the parameters of the acoustic model continuously and/or in real-time. In some aspects, the two or more learning rules include a user correction learning rule configured to update the parameters of the acoustic model based on an error between the predicted speech sounds and corrected speech sounds corresponding to a user correction of words or phrases output based on the predicted speech sounds.

In some aspects, the one or more learning rules comprise a sound context learning rule configured to reduce a difference between predicted speech sounds output the acoustic model and an inferred class of the predicted speech sounds based on context. The one or more learning rules can include a sound prediction learning rule configured to reduce an error between a prediction of upcoming speech sounds to be generated by the acoustic model and corresponding future predicted speech sounds output by the acoustic model.

In some aspects, the one or more learning rules include a sound distribution learning rule configured to reduce a difference between an observed distribution of speech sounds predicted by the acoustic model and a distribution of speech sounds in a reference dataset. Some aspects include receiving an initial trained version of the acoustic model from a cloud-based platform and configuring the SNN based on the initial trained version of the acoustic model.

In some aspects, initiating the action comprises providing the output data to a lexicon that is trained to output predicted words or phrases based on the predicted speech sounds, which are input into a language model trained to output predicted sentences or phrases wherein the client device determines the action based on the predicted sentences or phrases and causes the action to be performed.

The methods in accordance with the present disclosure can include any combination of the aspects and features described herein. That is, methods in accordance with the present disclosure are not limited to the combinations of aspects and features specifically described herein, but also may include any combination of the aspects and features provided.

Particular embodiments of the subject matter described in this specification can be implemented to realize one or more of the following advantages. Deploying a self-learning acoustic model on neuromorphic edge hardware (e.g., a neuromorphic processor) of an edge device as described in this document enables the acoustic model to be updated continuously, e.g., in real-time, at the edge device, which typically has limited computation resources relative to servers or cloud-based machine learning hardware. For example, a combination of learning rules described in this document can be selected and adapted to the capabilities of the neuromorphic processor such that robust acoustic model self-learning can be achieved on a lower power client device rather than in the cloud, e.g., on client devices having lower energy capabilities and less computational power relative to cloud-based or local server computers. This enables the acoustic model to be updated faster than cloud-based approaches and enables the acoustic model to be updated after each speech recognition event or after particular speech recognition events, e.g., each time the acoustic model is used to recognized speech input, without waiting for cloud-based hardware to retrain a model based on updated training data.

For example, the neuromorphic processor can update the acoustic model immediately (or within seconds or minutes) after a user corrects a conversational agent of a device on which the acoustic model is deployed. In a particular example, if a user corrects a voice assistant (e.g., a smart speaker) by, for example, repeating a command emphasizing a word or phrase that the voice assistant misrecognized, a dialogue manager of the conversational agent can trigger a learning process of the neuromorphic processor and the neuromorphic processor can update the acoustic model based on the correction in real-time, e.g., within seconds, of the correction being detected. This real-time updating reduces the number of mistakes made by a speech recognition component of an edge device in the future and results in faster and more accurate learning of the acoustic model, which in turn reduces user frustration and reduces the number of errors caused by misrecognizing voice commands that cause other components to perform actions.

The self-learning neuromorphic-based acoustic models described in this document provide increased robustness to noise, dialects, and accented speech across users and environments. This improves the usefulness of conversational agents in situations where the conversational agents are not currently available, makes the conversational agents more accessible to populations that are not currently served by conversational agents, and reduces user frustration when using conversational agents. The described acoustic models also adapt to different levels and types of noise, or to different speaker styles, enabling the system to work with higher accuracy as it learns. Implementing the self-learning acoustic models on low power consuming neuromorphic processors as described in this document allows more constrained client edge devices to include the self-learning acoustic models and conversational agents that leverage the acoustic models.

The details of one or more implementations of the present disclosure are set forth in the accompanying drawings and the description below. Other features and advantages of the present disclosure will be apparent from the description, drawings, and from the claims.

BRIEF DESCRIPTION OF THE DRAWINGS

Like reference numbers and designations in the various drawings indicate like elements.

DETAILED DESCRIPTION

Figure 1:
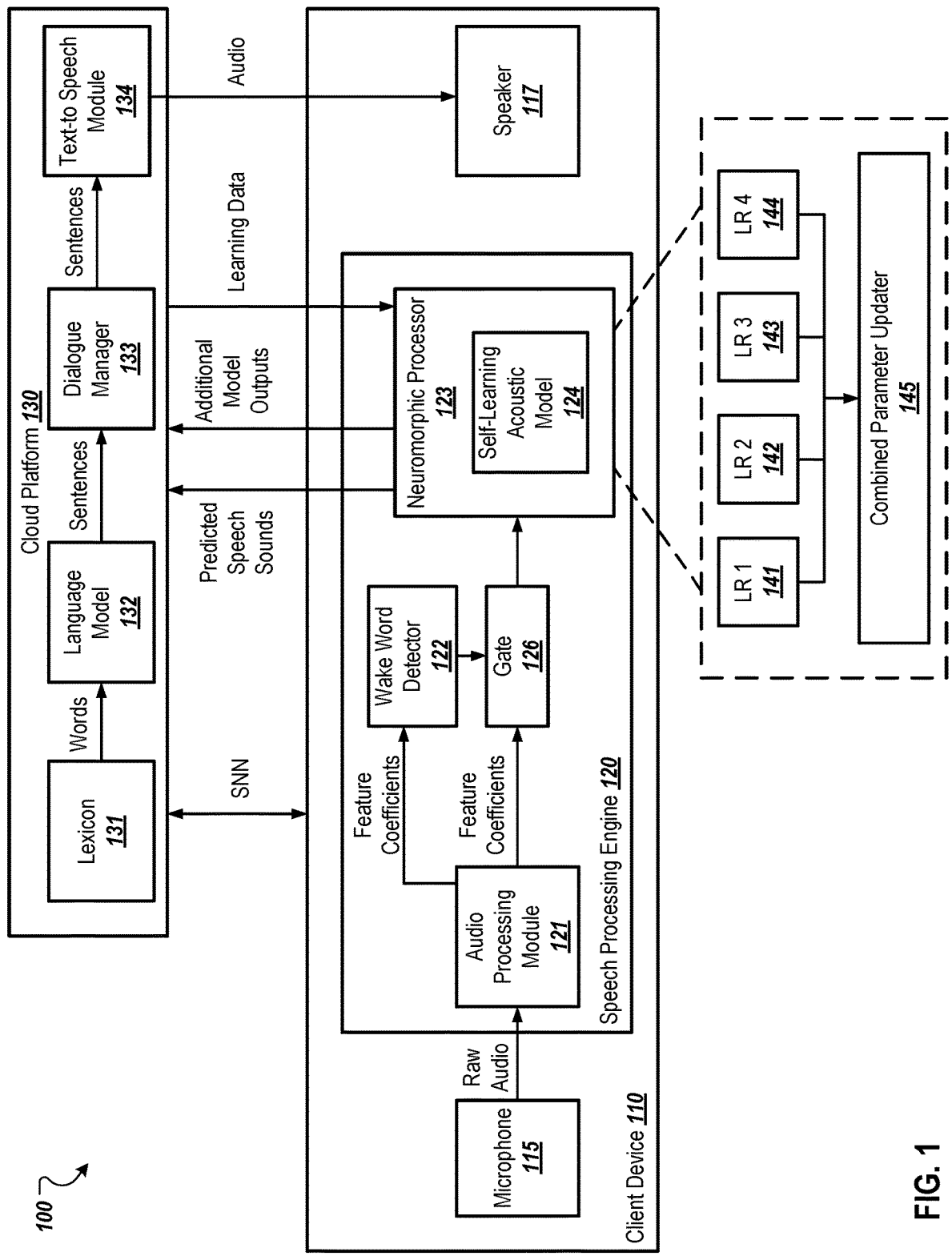
FIG. 1 depicts an example environment in which a neuromorphic processor runs a self-learning acoustic model on an edge device to recognize speech input.

FIG. 1 depicts an example environment 100 in which a neuromorphic processor 123 runs a self-learning acoustic model 124 on a client device 110 to recognize speech input. The client device 110 is an electronic device that is capable of communicating over a data communication network 105. Example client devices 110 include personal computers, mobile communication devices, e.g., smart phones and/or tablet computers, smart speakers, Internet of Things (IoT) devices, and/or other types of edge devices that can send and receive data over the network 105. In general, an edge device is a device that is located close to the edge of a distributed computing topology such that the edge device is closer to where data (e.g., voice input) is collected rather than at a central location, e.g., in the cloud.

The client device 110 includes a speech processing engine 120 that is configured to process speech input received from a microphone 115, which can be implemented as a single microphone or as a microphone array that includes multiple microphones. The speech input from the microphone 115 can be in the form of raw audio, e.g., audio that has not yet been processed. The microphone 115 can be part of the client device 110 as shown in FIG. 1 or communicably coupled to the client device 110, e.g., via a wired or wireless connections.

The speech processing engine 120 can include various software components that are configured to process audio input as part of an automatic speech recognition (ASR) process that is implemented in combination with a cloud platform 130. In other words, the speech processing engine 120 and the components of the cloud platform 130 combine to provide an ASR engine that is configured to recognize speech input received from the microphone 115. Although some components of the speech recognition process are implemented in the cloud platform 130 in this example, the components can be implemented on the client device 110 or another device that is not part of a cloud environment.

The example speech processing engine 120 includes an audio processing module 121, a wake word detector 122, a gate 123, and a self-learning acoustic model 124 implemented on a neuromorphic processor 123. These software components can be implemented on one or more integrated circuits (also referred to as chips) of the client device 110. In some implementations, the functionality of some of these components can be combined in a single module. For example, the audio processing module 121 can include an integrated wake word detector and gate.

The audio processing module 121 is configured to receive the raw audio from the microphone 115 and process the raw audio, e.g., using digital signal processing (DSP) techniques. The processing can include, for example, normalizing and standardizing the range and variability of the raw audio. This processing can also filter out electrical fluctuations and other unwanted noise in the raw audio.

The audio processing module 121 can include a feature extractor that is configured to analyze the preprocessed audio to generate feature coefficients that can be used by the self-learning acoustic model 124 on the neuromorphic processor 123 and the wake word detector 122. The feature extractor can generate feature coefficients that represent characteristics of the preprocessed audio. For example, the feature coefficients can represent the amount of acoustic energy within each of multiple frequency bands, the amplitude of a particular frequency component, and/or other appropriate audio characteristics. For example, the output of the feature extractor can include, for each of multiple time windows, feature coefficients that represent the amount of acoustic energy in each of the multiple frequency bands. The feature extractor can use Fourier transforms, e.g., discrete Fourier transforms (DFTs) to extract the acoustic energy information and/or other audio characteristics in the frequency domain. The feature extractor can use other transforms (e.g., Wavelet transforms) and/or other processes (e.g., filter banks) to extract the audio characteristics. Some example feature extraction techniques that can be used by the speech recognition include Mel Frequency Cepstral Coefficients (MFCC), Linear Prediction Coefficients (LPC), Linear Prediction Cepstral Coefficients (LPCC), Line Spectral Frequencies (LSF), and/or digital cochlear techniques, to name just a few examples.

The feature extractor outputs the feature coefficients to the wake word detector 122. The audio processing module 121 can be part of a conversational agent of the client device 110. For example, the conversational agent can receive voice commands from a user and perform actions in response to those voice commands. Conversational agents can have a wake word detector 122 for detecting a "wake word" that signals to the conversational agent that the user is about to provide a voice command. In implementations that do not include a conversational agent, the wake word detector 122 and gate 126 may not be part of the speech processing engine 120 or ASR engine. In addition, conversational agents can include push to talk functionality in addition to, or instead of, a wake word detector 122. In such an example, the client device 110 can include a button that, when pressed, causes the conversational agent to transition to a voice mode in which the conversational agent monitors for voice commands or other voice input.

The wake word detector 122 can process the feature coefficients to determine whether the "wake word" was spoken by a user of the client device 110. If so, the wake word detector 122 can open the gate 126 to allow the feature coefficients to pass through to the ASR (e.g., the self-learning acoustic model 123 and components of the cloud platform 130) until a stop condition occurs to close the gate 126. The stop condition can be the lapsing of a time duration after the wake word was detected or a time duration following a last detected speech from the microphone 115. The stop condition can also include the completion of an action, or a command by the user. For example, the user could tell the system to go away, or stop listening. The user could tell the system to call someone, and at that point the channel would be closed to additional commands once the phone call was placed.

While the gate 126 is open, the neuromorphic processor 123 receives the feature coefficients output by the audio processing module 121. The neuromorphic processor 123 runs the self-learning acoustic model 124, which is also referred to as acoustic model 124 for brevity, and updates the acoustic model 124. The acoustic model 124 represents relationships between audio signals and units of sound, e.g., phonemes. The acoustic model 124 can be configured to receive, as inputs, the feature coefficients that represent the amount of acoustic energy in each of the multiple frequency bands and output predicted speech sounds that represent a prediction of the speech, e.g., in the form of textual phonemes, triphones, or other units of sound, corresponding to the feature coefficients. For example, the neuromorphic processor 123 can receive the feature coefficients from the audio processing module 121, run the acoustic model 124 using the feature coefficients as inputs to the acoustic model 124, and output the predicted speech sounds.

The client device 110 can provide the predicted speech sounds to the cloud platform 130 so that the cloud platform 130 can recognize the speech input of the user corresponding to the detected speech sounds. The client device 110 also provides additional outputs of the acoustic model 124 to the cloud platform 130. For example, the acoustic model 124 can be configured to output, for each predicted speech sound, a confidence level that indicates a confidence that the predicted speech sound matches a corresponding utterance represented by feature coefficients.

The example cloud platform 130 includes a lexicon 131, a language model 132, a dialogue manager 133, and a text-to-speech module 134. In general, the lexicon 131 and language model 132 are parts of the ASR engine that process the predicted speech sounds output by the acoustic model 124 to recognize the words and sentences spoken by the user. In other words, the ASR engine includes the acoustic model 124, the lexicon 131, and the language model 132, which can be implemented on the client device 110 and cloud platform 130 as shown, or on a single device (e.g., the client device 110).

In this conversational agent example, a dialogue manager 133 also generates a response to the user's speech and provides the response in the form of text to the text-to-speech module 134. The text-to-speech module 134 converts the text response to audio speech output and provides the audio speech output to the client device 110 to be played by a speaker 117 of the client device 110. In non-conversational agent examples, the dialogue manager 133 and text-to-speech module 134 can be excluded. For example, the cloud platform 130 can respond with text response that are displayed by the client device 110 or pre-recorded audio that is played by the speaker 117.

The lexicon 131 indicates how words are pronounced phonetically and can be implemented as a dictionary or lookup table for a particular spoken language. That is, the lexicon 131 for a particular language can map phonemes to words. The cloud platform 130 can use the lexicon 131 to convert the predicted speech sounds, which can be in the form of phonemes, to individual words.

The cloud platform 130 can use the language model 132 to convert the words determined using the lexicon 131 to sentences. The language model 132 can be implemented as a machine learning model (e.g., a neural network), an N-gram model, or another appropriate type of model that can be used to convert words to sentences. In a machine learning model example, the words can be provided as input to the machine learning model and the machine learning model can be trained to output sentences based on the input.

The sentences determined by the language model 132 are provided to the dialogue manager 133. The dialogue manager 133 can parse each sentence, e.g., to determine the intent of the sentence(s). The dialogue manager 133 can be configured to determine an action based on the intents. For example, the dialogue manager 133 can determine that the intent of the sentence "call mom" is "Phonecall" and that this has a corresponding slot "who=mom." The dialogue manager 133 can then perform or initiate an action corresponding to the intent and slot. Continuing the previous example, the dialogue manager 133 could initiate a call from the client device to the contact corresponding to "mom."

Although the lexicon 131, language model 132, dialog model 133, and text-to-speech model 134 are shown as being implemented on the cloud platform 130, some or all of these components can be implemented on the client device 110. In some cases, a cloud platform 130 may be better equipped with more robust computational resources to implement large lexicons and language models. However, robust client devices 110 can also include these components. To make the lexicon 131 and language model 132 more suitable for client devices 130, they can be compressed or limited to a subset of domains appropriate for the user(s) of the client device 110.

As described below, the neuromorphic processor 123 can update the acoustic model 124 in real-time (e.g., within seconds or even milliseconds) after a speech recognition event occurs. Although the neuromorphic processor 123 may not update the acoustic model 124 after every speech recognition event, it has this capability due to the neuromorphic processor 123 being implemented on the client device 110 and the speed at which the neuromorphic processor 123 can update the acoustic model 124. A speech recognition event is an event in which the speech processing engine 120 receives audio input and outputs recognized speech sounds based on the audio input. In other words, each time the speech processing engine 120 evaluates a speech input can be considered a speech recognition event.

The neuromorphic processor 123 can update the acoustic model 124 using one or more learning rules, as described in more detail below. These learning rules can take into account learning data from the language model 132, e.g., predicted sentences generated by the learning model 132. The neuromorphic processor 123 can selectively determine whether to update the acoustic model 124 using the learning rules and this learning data received from the language model 132, as described in more detail below. For example, the neuromorphic processor 123 may only update the acoustic model 124 when a learning rule indicates a sufficient error (e.g., an error above a threshold).

The acoustic model 124 can be implemented as a spiking neural network (SNN) that runs on the neuromorphic processor 123. A spiking neural network is an artificial neural network that uses biologically realistic models of neurons to closely imitate natural neural networks. Example neuromorphic processors include Intel's Loihi chip and BrainChip's Akida™ chip. The neuromorphic processor 123 includes special-purpose machine learning circuits. For example, the neuromorphic processor 123 can include neurons that are implemented as hardware neuron cores and that output spikes based on voltage or current inputs to the neurons. A neuron core can output spikes based on the neuron voltage reaching a threshold after integrating input spikes or current. The spikes can be signals, e.g., messages, sent between neurons and, in some cases, can carry a message payload. A spike is a binary signal that can be positive or negative and that modifies the voltage of neurons based on the weight of the synapse.

In some implementations, the neurons of the neuromorphic processor 123 follow the one-step leaky-integrate-and-fire (LIF) dynamics (each presynaptic spike directly increases the membrane voltage of the postsynaptic neuron). However, the acoustic model 124 could be effectively implemented with non-leaky neurons (IF), two-step LIF neurons (each presynaptic spike generates a current, which is in turn integrated into the voltage of the postsynaptic neuron's membrane potential), Izhikevich neurons, resonate-and-fire neurons, and/or other appropriate types of neurons.

In some implementations, the voltage can be increased at the neuron upon receipt of each spike until a threshold is reached, e.g., using the LIF dynamics. The voltage can also decay over time if regular input is not received. When the threshold is reached, that neuron can fire, e.g., output spike signals to a next neuron in the network and the voltage is reset. Connection weights at the input to a neuron can control the increase in the voltage value at the neuron caused by each spike.

Through these connections, the neurons can form a network that can be made up of one or more layers. The neurons in the network will encode information based on the timing of the spike input received, the LIF dynamics, and the connection weights. The encoded information will represent different features extracted from the input, except for the output layer of neurons which will be used to generate the likelihood of the input being a particular speech sound or components of a speech sound which can be derived from certain statistics including but not limited to spike rate, inter spike interval, and membrane potential voltage of the output layer neurons. This SNN will be used for the acoustic model 124 whose connection weights can be updated through initial offline training before deployment at the edge, and later updated through learning rules including but not limited to LR 1 141, LR 2 142, LR 3 143, and LR 4 144 at the edge after deployment.

Figure 2:
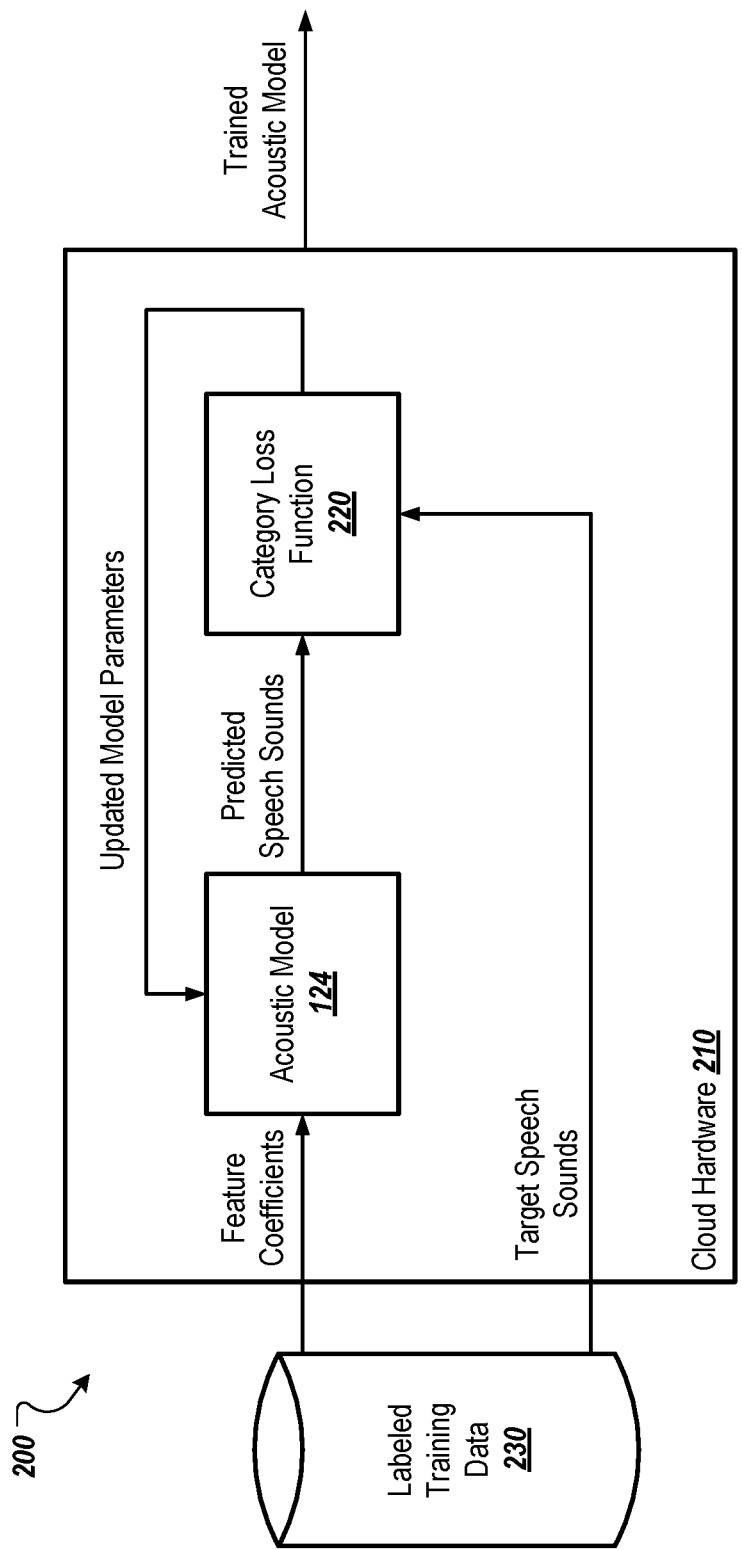
FIG. 2 depicts a data flow of an example process for initial supervised training of a self-learning acoustic model.

During the initial training of the acoustic model 124, the neuromorphic processor 123 or another neuromorphic processor (e.g., one running on a server or in a cloud-based platform such as the cloud platform 130) can update parameters of the SNN, including the connection weights of the neurons, to reduce errors in the recognition of speech input. In some implementations, other parameters can also be updated, such as the number of neurons and/or the thresholds of the neurons. In general, the training neuromorphic processor can use supervised learning techniques to train the acoustic model 124 based on a set of training data. The training data can include pre-recorded labeled training data. The pre-recorded training data can include, for each spoken utterance, a label that indicates the actual utterance. An example process for initially training the acoustic model 124 is illustrated in FIG. 2 and described below.

If initially trained by the cloud platform 130, the cloud platform 130 can deploy the acoustic model 124 to the neuromorphic processor 124, e.g., by providing the SNN of the acoustic model 124 to the client device 110. After deploying the trained acoustic model 124 to the neuromorphic processor 124 at the edge, the neuromorphic processor 124 can use a set of learning rules to update, e.g., continuously and/or in real-time, the acoustic model 124 at the client device 110. In this way, the neuromorphic processor 123 can adapt the acoustic model 124 for the particular user(s) of the client device 110, thereby providing more accurate speech recognition for the user(s) quickly and efficiently. The neuromorphic processor 124 can also use the learning rule(s) to adapt the acoustic model 124 for particular environmental conditions, such as noise, distance of the user from the microphone 115, microphone parameters, and/or other physical parameters that can be learned from for better separation and noise reduction. The client device 110 can provide the updated acoustic model 124 back to the cloud platform 130. In this way, the cloud platform 130 can further update the acoustic model 124 with additional training and/or deploy the updated acoustic model 124 on other client devices.

In some implementations, the client device 110 can provide the updated acoustic model 124 or parameters of the acoustic model to the cloud platform 130. Other client devices can also update their acoustic models and provide their acoustic models or parameters of their acoustic models to the cloud platform 130. In this way, the cloud platform 130 can use federated learning techniques to update the acoustic model 124 based on learning at multiple client devices and deploy this updated acoustic model to the client devices.

In this example, the neuromorphic processor 123 uses a set of four learning rules 141-144 to update the acoustic model 124 as part of self-learning for the acoustic model 124. However, any quantity of learning rules can be used. The neuromorphic processor 123 can process one or more of the learning rules continuously and/or for each or some speech recognition events and update the parameters of the acoustic model 124 each time the learning rule(s) are processed or each time a learning rule indicates that the parameters of the acoustic model 124 should be updated.

The neuromorphic processor 123 can selectively process the learning rules based on the type of speech recognition event. For example, a learning rule can correspond to a user correction of a speech recognition result where a user actively corrects the speech processing engine 120. In this example, the neuromorphic processor 123 may only process this rule in response to a user correction event. Another learning rule can correspond to differences between the distribution of speech sounds captured by the microphone 115 and the distribution of speech sounds in a reference data set. This neuromorphic processor 123 can process this learning rule in response to every speech recognition event, but may only process this learning rule in response to certain speech recognition events. Example self-learning techniques using example learning rules are described below with reference to FIGS. 3-7.

The neuromorphic processor 123 also includes a combined parameter updater 145 that can update the parameters of the acoustic model 124 based on the parameter updates resulting from the processing of one or more of the learning rules. For example, multiple learning rules can affect the same parameters of the acoustic model 124 in different ways. In a particular example, one learning rule may result in an increase in an input weight of a particular neuron while another learning rule may result in a decrease in the input weight. The combined parameter updater 145 can apply respective weights to the updated output for each learning rule, e.g., based on the learning rates for the learning rules. For example, the combined parameter updater 145 can apply higher weights to updated parameters for some learning rules than for other learning rules. In some implementations, the combined parameter updater 145 can apply a weight to an updated parameter by multiplying the updated parameter by the weight.

In some implementations, if a synapse is learning, then after receiving a spike or outputting a spike the neuron will output a trace. The trace decays over time if no spikes are sent or received. Neuron synapse weights are updated based on the strengths of the traces. Therefore, more active neurons will update parameters more strongly. Since there are multiple learning rules, the combined parameter updater 145 can apply the updates of each of the learning rules. The learning rules can have different parameters for updating such as the decay rate of the traces and learning rate which will affect how much synapse weights can be updated.

In some implementations, the neuromorphic processor 123 and/or other components of the ASR process are configured to detect when a speech recognition result is erroneous, e.g., based on feedback from the user. For example, if the dialogue manager 133 repeats a command incorrectly or performs a task that does not correspond to the user's input, the user may repeat a command in a different manner, e.g., by overemphasizing certain syllables or slowing their speech. As part of its training of the SNN, the neuromorphic processor 123 can learn the speed at which the user speaks and detect when the user is overemphasizing words.

In another example, the client device 110 can provide a user interface, e.g., a graphical user interface (GUI) that also enables the user to provide commands to the client device 110. If an error is detected, the neuromorphic processor 123 can provide information indicating the error to the dialogue manager 133.

In another example, the dialogue manager 133 can be configured to store a log of recent commands and use the log to determine whether a user is repeating commands. If the same or similar command or the same class of command is repeated at least a threshold number of times within a given time period, the dialogue manager 133 can determine that there has been an error in the speech recognition process.

If an error is detected, the dialogue manager 133 can perform a corrective action. For example, the dialogue manager 133 can instruct the neuromorphic processor 123 to process a learning rule to update the SNN to reduce the likelihood of the error occurring in the future. If the user provided corrective speech, e.g., by slowing their speech or overemphasizing a word or syllable when repeating a command, the dialogue manager 133 can output a request to the user using the speaker 117 to request that the user provide normal speech input to prevent errors in speech recognition caused by such corrective speech.

FIG. 2 depicts a data flow of an example process 200 for initial supervised training of a self-learning acoustic model 124. In this example, cloud hardware 210 of a cloud platform performs the initial training. For example, one or more servers having one or more neuromorphic processors (or other appropriate processors for training machine learning models) installed thereon can train the acoustic model 124 for deployment to one or more client devices, e.g., the client device 110 of FIG. 1. In this way, the initial training is performed using more powerful computers that can readily train the acoustic model 124 using a large set of training data that would be impractical for client devices 110. Instead, the client devices 110 may only be tasked with performing the local updates in real time, which can be readily performed by neuromorphic processors.

The cloud hardware 210 can train the acoustic model 124, which includes a SNN as described above with reference to FIG. 1, using labeled training data 230. As described above, the training data can include pre-recorded labeled data that includes, for each spoken utterance, a label that indicates the actual utterance. For example, the label for each spoken utterance can be a phonetic transcription of the spoken utterance, e.g., the IPA representation of the utterance.

In some implementations, the labeled training data 230 is selected for training the acoustic model 124 based on the location of the client device 110 or the user of the client device 110. For example, the labeled training data 230 can include utterances spoken in the same language, dialect, and/or prevalent accent as in the geographic location of the client device 110. In this way, the initially trained acoustic model 124 is already pre-adapted for users of that location. In some implementations, the labeled training data is based on utterances detected using the microphone 115 of the client device 110 for which the acoustic model is being trained. Otherwise, the microphone 115 and its associated characteristics become additional aspects to which the ASR engine has to adapt.

Feature coefficients for the utterances of the labeled training data 230 are provided as input to the acoustic model 124. For example, a feature extractor can analyze the audio for the utterances to generate feature coefficients for input to the acoustic model 124. The acoustic model 124 can predict the speech sounds corresponding to the feature coefficients and output the predicted speech sounds. The cloud hardware 210 can use a loss function to quantify the error for each predicted speech sound relative to the label (e.g., target speech sound) for the utterance corresponding to the predicted speech sound. In this example, the loss function is a category loss function 220. A category loss function is a loss function that is used in machine learning classification problems to compute the loss between true labels and predicted labels, e.g., between the labels of the labeled training data 230 and the predicted speech sounds.

As part of the initial training, the cloud hardware 210 can update the parameters of the acoustic model 124 based on the computed loss between the labels for each predicted speech sound using the loss function 220. The cloud hardware 210 can continue training the acoustic model 124 by predicting speech sounds corresponding to feature coefficients and updating the parameters of the acoustic model 124 based on the computed losses until a stop condition is met. For example, the stop condition can be when the computed loss is less than a threshold for at least a specified quantity of predicted speech sounds.

The cloud platform that includes the cloud hardware 210 can deploy the initial trained acoustic model 124 to one or more client devices 110. For example, if the acoustic model 124 is trained for a particular user, the cloud platform can send the trained acoustic model 124 to the client device 110 of that user. The initial trained acoustic model 124 can also be deployed on the client device 110, e.g., flashed on the client device 110, when the client device 110 is manufactured and prior to being shipped. For example, the initial trained acoustic model 124 can be pre-installed on client devices 110 when the acoustic model 124 is not dependent on the user of the client device 110.

If the acoustic model 124 is trained for a group of users, e.g., users in a particular geographic region, that include a particular type of edge device (e.g., a device having a conversational agent), the cloud platform can send the trained acoustic model 124 to the client device 110 of each user in the group. Thus, the cloud platform can train an acoustic model and deploy it on multiple client devices 110. Each client device 110 can install the initial trained acoustic model 124 on the neuromorphic processor 123. This can include updating parameters of a SNN on the neuromorphic processor 123 based on the parameters of the initial trained acoustic model 124, e.g., using a known mapping or quantization to port the parameters to the neuromorphic processor 123. The neuromorphic processor 123 can then use the acoustic model 124 to predict speech sounds corresponding to the feature coefficients output by the audio processing module 121, which are derived from the raw audio captured by the microphone 115.

As described above, the neuromorphic processor 123 can update the acoustic model 124 continuously, in real-time, and/or in response to speech recognition events using one or more learning rules. FIGS. 3-6 depict the data flows for updating the acoustic model 124 using example learning rules that are adapted to self-learning on the neuromorphic processor 123. These learning rules include, but are not limited to, a user correction learning rule, a sound context learning rule, a sound prediction learning rule, and a sound distribution learning rule. The neuromorphic processor 123 can use any one of these learning rules or any combination of two or more of these learning rules. In a particular example, the neuromorphic processor 123 can use all four of these learning rules to update the acoustic model 124 at the client device 110. The neuromorphic processor 123 can also use other learning rules in place of and/or in combination with one or more of the example learning rules described herein.

Figure 3:
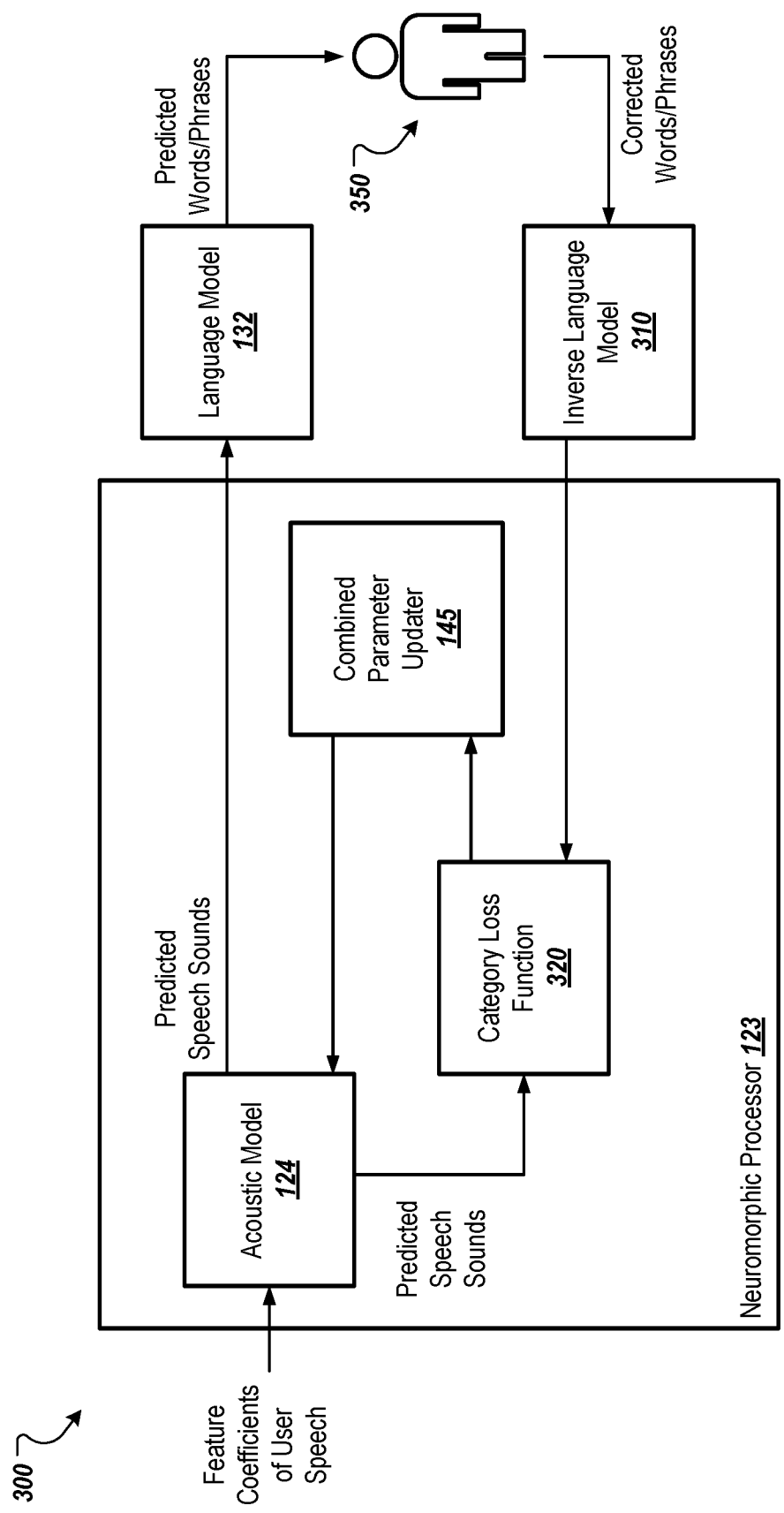
FIG. 3 depicts an example data flow of an example process for updating a self-learning acoustic model using a user correction learning rule.

FIG. 3 depicts an example data flow of an example process 300 for updating a self-learning acoustic model 124 using a user correction learning rule. The example process 300 can be performed by the neuromorphic processor 123 in combination with components of the cloud platform 130 of FIG. 1.

During normal operation of the neuromorphic processor 123, the neuromorphic processor 123 runs the acoustic model 124 to output predicted speech sounds based on feature coefficients that represent the acoustic energy of user speech captured by the microphone 115. The neuromorphic processor 123 also updates the acoustic model 124 during its normal operation.

The user correction learning rule can be used to reduce the likelihood of an incorrect classification of observed speech sounds of a user 350 by the acoustic model 124 when given direct corrective feedback from the user 350. The corrective feedback can be provided using speech input through the microphone 115 or a different input modality, e.g., a graphical user interface of the client device 110. For example, when a user 350 perceives that a speech processing engine 120 has misunderstood the user's speech, the user 350 will often repeat or rephrase the speech, sometimes with a different inflection or prosody, or preface a correction with a statement indicating a desire to correct (e.g., "no, I mean . . . "). In another example, a repeat of the same command could be detected on the client device 110 through a similarity measure between the two commands. Upon detecting such a correction event, the user correction learning rule would reduce the likelihood of producing the same output by updating parameters of the acoustic model 124 to account for the user correction.

Similarly, when a user's speech input cannot be correctly mapped to any valid sequence of speech sounds mapped to words and/or phrases by the language model 132, such as a command or request, the dialogue manager 133 will often reply with a request to repeat the command or request or to indicate that the speech processing engine 120 did not understand the command or request. The acoustic model can then learn using the user correction rule from repeated commands by the user until the acoustic model can map the speech input correctly to a valid sequence of speech sounds.

The neuromorphic processor 123 can route the predicted speech sounds output by the acoustic model to the language model 132 in the cloud platform 130. As described above, the cloud platform 130 can use the language model 132 to predict words or phrases corresponding to the input predicted speech sounds and perform an action based on the predicted words or phrases, e.g., when the predicted words or phrases are determined to match a command to perform the action. In some cases, the command may be misinterpreted based on errors in the predicted speech sounds when the predicted speech sounds do not match the user's actual speech input. In these situations, the cloud platform 130 can initiate the wrong action and the user 350 can correct the speech processing engine 120 using speech input or another input modality, as described above. For example, the user 350 can repeat the command, placing more emphasis on the word(s) that appear to have been misrecognized.

The cloud platform 130 can use an inverse language model 310 to identify the set of speech sounds for the corrected words or phrases. In some implementations, the inverse language model 310 is a lookup table that maps words or phrases to their speech sounds that represent their pronunciations. In this example, the cloud platform 130 can compare the corrected words or phrases to the lookup table to obtain the speech sounds for the corrected words or phrases.

The neuromorphic processor 123 can use, for example, a category loss function to quantify the error between the predicted speech sounds output by the acoustic model 124 and the speech sounds corresponding to the corrected words or phrases. The neuromorphic processor 123 can then update the parameters of the acoustic model 124 based on the error and provide the updated parameters to the combined parameter updater 145. As described above, the combined parameter updater 145 can combine the parameter updates generated using multiple learning rules and then update the acoustic model 124 using the updated parameters. If only the user correction learning rule is used, the neuromorphic processor 123 can update the parameters of the acoustic model 124 using the updated parameters determined based on the error computed using the category loss function 320. The neuromorphic processor 123 can process the user correction learning rule for each speech recognition event for which the user 350 provides a correction.

The neuromorphic processor 123 can be configured to update the parameters using the user correction learning rule based on a learning rate for the user correction learning rule. The learning rate drives how much of an adjustment the neuromorphic processor applies to the parameters based on the amount of error determined using the category loss function 320.

Each learning rule can have a corresponding learning rate. A higher learning rate corresponds to faster learning and larger adjustments to parameters of the acoustic model 124. Thus, some learning rules can have higher learning rates than other learning rules. In some implementations, the user correction has a high learning rate, e.g., the highest learning rate, among the learning rules used by the neuromorphic processor 123 since it represents a high probability of an error made by the acoustic model 124.

Figure 4:
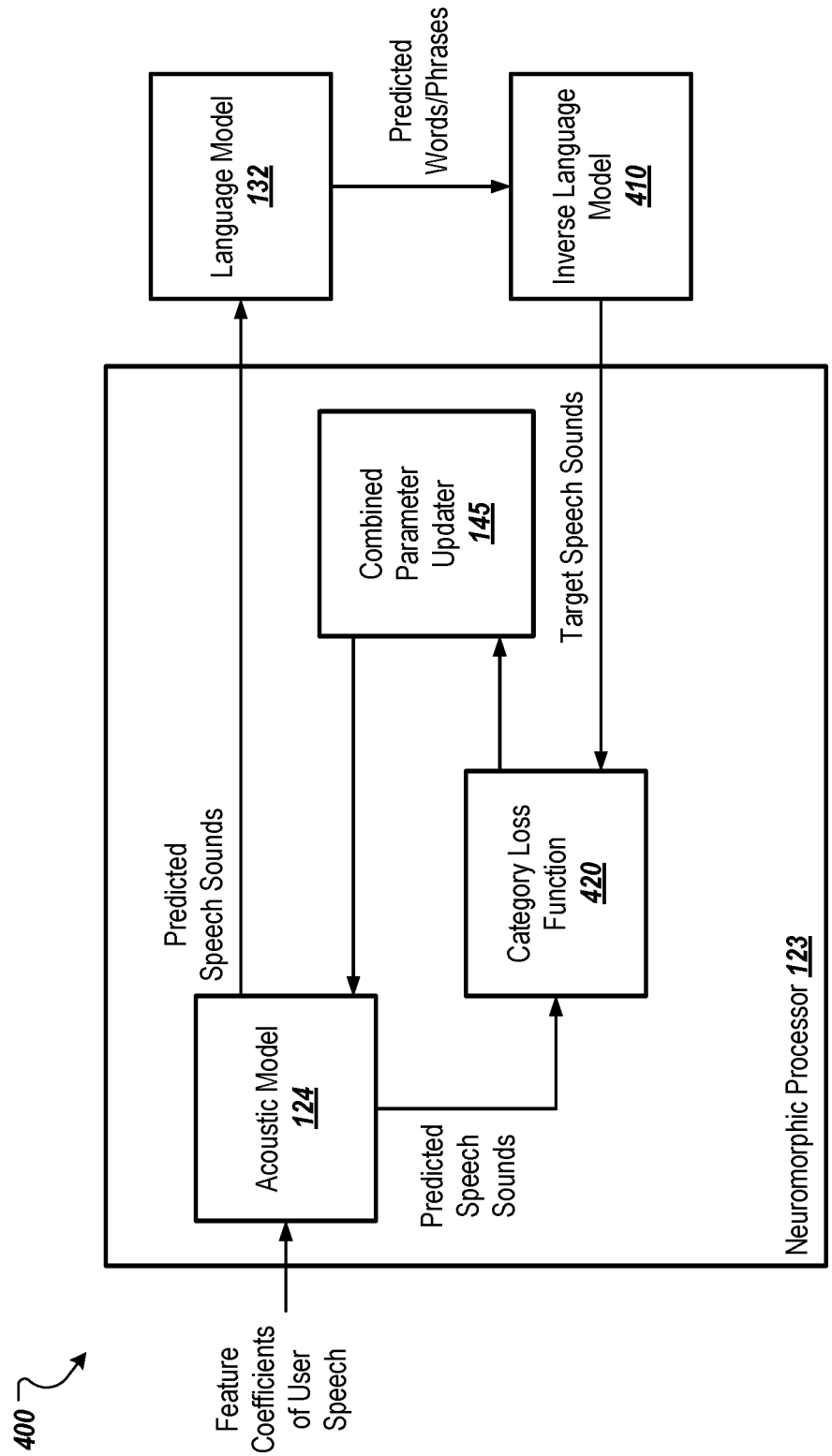
FIG. 4 depicts an example data flow of an example process for updating a self-learning acoustic model using a sound context learning rule.

FIG. 4 depicts an example data flow of an example process 400 for updating a self-learning acoustic model 124 using a sound context learning rule. The sound context rule is used to update the self-learning acoustic model 124 to account for mismatches between predicted words by the language model and predicted phonemes by the acoustic model 124. The example process 400 can be performed by the neuromorphic processor 123 in combination with components of the cloud platform 130 of FIG. 1.

The sound context learning rule minimizes or at least reduces the difference between a classification of the observed speech sounds generated by the acoustic model 124 and the inferred class of the same speech sounds based on the context in which the speech is recognized, e.g., in cases which are constrained by the linguistic context. In a multi-syllable word or phrase which is accurately recognized by the speech processing engine 120, any individual speech sound is constrained by the preceding and following speech sounds, and by the overall utterance of the user. This sound context learning rule can rely on these constraints to assume or infer the correct speech sound, even when the acoustic model 124 classifies the acoustic signals otherwise. For example, if the acoustic model 120 processes a speech signal corresponding to word "tomato" by generating a particular IPA representation, the weights for the neurons of the acoustic model 124 corresponding to the phonemes of the IPA representation would be updated to adapt to the user's speech patterns.

The neuromorphic processor 123 can route the predicted speech sounds output by the acoustic model to the lexicon 131 in the cloud platform 130. As described above, the cloud platform 130 can use the lexicon 131 to predict words or phrases corresponding to the input predicted speech sounds. The predicted words are input to the language model 132 in the cloud platform 130 to predict phrases and sentences and perform an action based on the predicted sentences or phrases, e.g., when the predicted sentences or phrases are determined to match a command to perform the action.

The cloud platform 130 can identify a set of target speech sounds for the predicted words or phrases using an inverse language model 410. Similar to the inverse language model 310 of FIG. 3, the inverse language model 410 can be a lookup table that maps words or phrases to their speech sounds that represent their pronunciations. In this example, the cloud platform 130 can compare the predicted words or phrases to the lookup table to obtain the target speech sounds for the predicted words or phrases.

The neuromorphic processor 123 can quantify the error between the predicted speech sounds output by the acoustic model 124 and the target speech sounds corresponding to the predicted words or phrases. In this example, the neuromorphic processor 123 uses a category loss function 420 to quantify the error between the predicted speech sounds output by the acoustic model 124 and the speech sounds corresponding to the predicted words or phrases. Other appropriate loss functions or other techniques can also be used. The neuromorphic processor 123 can then update the parameters of the acoustic model 124 based on the error and provide the updated parameters to the combined parameter updater 145. As described above, the combined parameter updater 145 can combine the parameter updates generated using multiple learning rules and then update the acoustic model 124 using the updated parameters. If only the sound context learning rule is used, the neuromorphic processor 123 can update the parameters of the acoustic model 124 using the updated parameters determined based on the error computed using the category loss function 420.

The neuromorphic processor 123 can be configured to update the parameters using the sound context learning rule based on a learning rate for the sound context learning rule. The learning rate for the sound context learning rule can also be a high learning rate, but may be lower than the learning rate for the user correction learning rule. The neuromorphic processor 123 can process the sound context learning rule for each speech recognition event for which the acoustic model 124 outputs predicted speech sounds.

Figure 5:
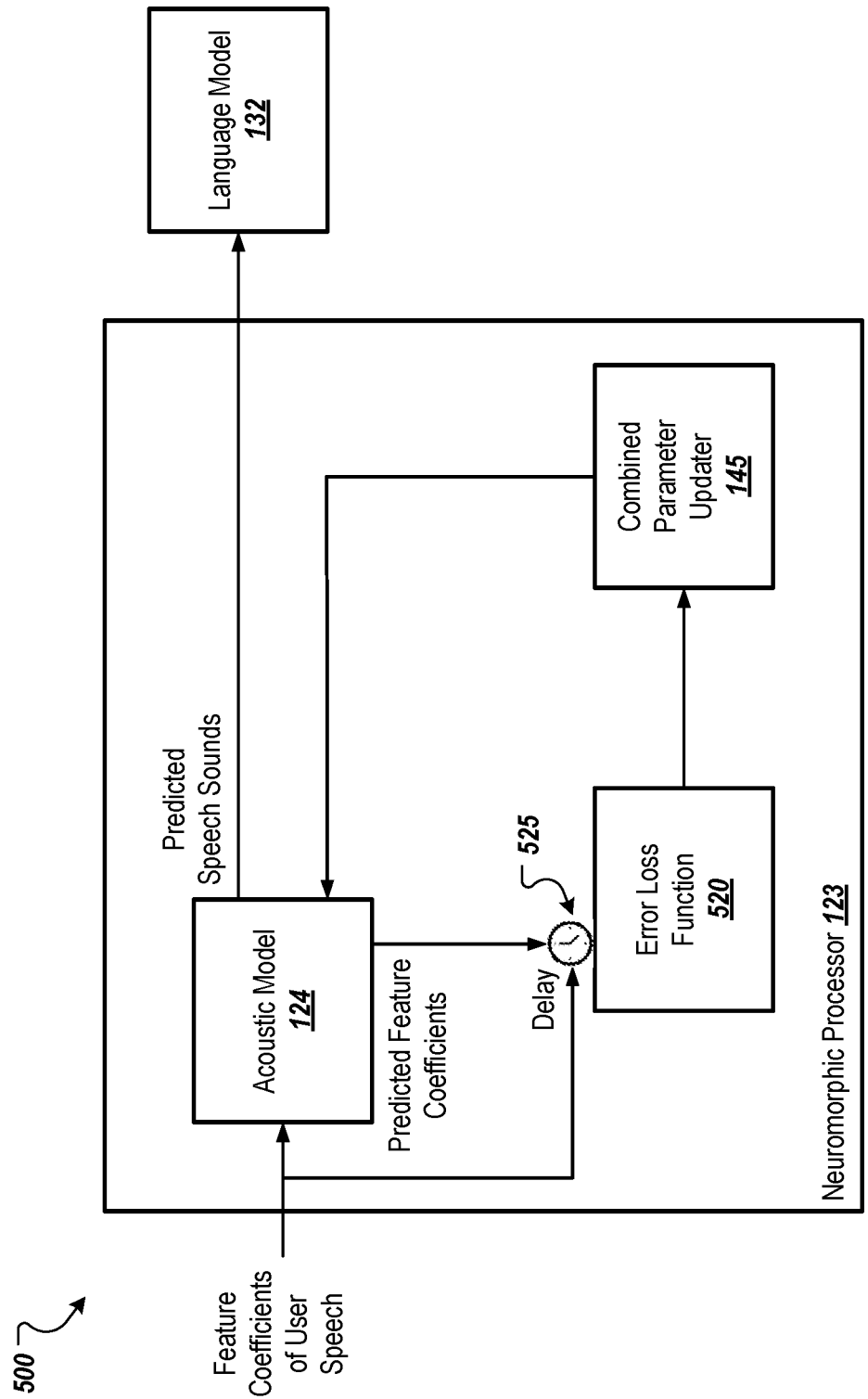
FIG. 5 depicts an example data flow of an example process for updating a self-learning acoustic model using a sound prediction learning rule.

FIG. 5 depicts an example data flow of an example process 500 for updating a self-learning acoustic model using a sound prediction learning rule. The example process 400 can be performed by the neuromorphic processor 123 in combination with components of the cloud platform 130 of FIG. 1.

The sound prediction learning rule minimizes or at least reduces the error between a prediction of the upcoming speech sounds generated by the acoustic model 124 (or a prediction of future feature coefficients that will be received by the acoustic model 124) and the actual observed speech sounds (or the actual feature coefficients). This can be important as it allows the speech processing engine 120 to operate in a fully self-supervised manner in which only the future speech of the user is needed to adjust the parameters of the acoustic model 124. In addition, partial predictions can also be used to improve efficiency. For example, predicting the speech sounds of parts of speech while other parts are indecipherable due to background noise or an end of speech event is not detected reduces the latency in providing a response to the user. The sound prediction learning rule can be processed continuously by the neuromorphic processor 123 allowing for real-time and continuous self-learning of the acoustic model 124. In this example, the acoustic model 124 is configured to output the predicted speech sounds and/or predicted feature coefficients for future utterances that the acoustic model 124 predicts the user to make. The acoustic model 124 can predict future utterances based on the predicted speech sounds. For example, the acoustic model 124 can predict the future utterances based on a probability of the future utterances following the predicted speech sounds output by the acoustic model 124.

The neuromorphic processor 123 can use an error loss function 520 to quantify the error between the predicted feature coefficients of the predicted future utterances to the actual feature coefficients of actual future utterances made by the user. The neuromorphic processor 123 can add a delay 525 to the predicted coefficients output by the acoustic model 124 such that these predicted feature coefficients are matched up with and compared to the actual feature coefficients of the future utterances of the user. The time delay can be a short delay, e.g., in the range of 10-100 milliseconds (ms).

In some implementations, the error loss function can include multiple loss functions, e.g., using mean squared error (MSE). One error loss function can be used to learn an appropriate encoding of the features. This error loss function is used to compute errors that will yield similarities and/or redundancies between features in the encoded space. These are then used to generate the future feature coefficients. The other error loss function can compute the difference between the generated and actual future feature coefficients.

The neuromorphic processor 123 can generate updated parameters for the acoustic model 124 based on the error between the predicted feature coefficients for future user utterances and the actual feature coefficients of the actual user utterances, e.g., the error computed using the error loss function 520. The neuromorphic processor 123 can provide the updated parameters to the combined parameter updater 145. As described above, the combined parameter updater 145 can combine the parameter updates generated using multiple learning rules and then update the acoustic model 124 using the updated parameters. If only the sound prediction learning rule is used, the neuromorphic processor 123 can update the parameters of the acoustic model 124 using the updated parameters determined based on the error computed using the error loss function 520.

In some implementations, the acoustic model 124 can have multiple heads, one of which predicts the current speech sound and the other of which predicts the next speech sound. The error can correspond to the error between the two speech sounds. This can have a similar outcome to that of a word embedding model where the probability distributions and contexts of speech sounds are learned jointly Using the sound prediction learning rule enables the neuromorphic processor 123 to compress speech-related features that are about to be processed by the speech processing engine 120 into the acoustic model 124. This can enable the neuromorphic processor 123 to update the parameters of the acoustic model 124 to compress the most meaningful information about the user's speech into the acoustic model 124. For example, this enables the acoustic model 124 to identify what distinguishes sharp temporal boundaries between units of sound, which significantly improves the accuracy of the speech recognition for the user. To compress the speech-related features, the neuromorphic processor 123 can learn a feature representation of a given input that is smaller in dimensionality than the given input.

The neuromorphic processor 123 can be configured to update the parameters using the sound prediction learning rule based on a learning rate for the sound prediction learning rule. The learning rate for the sound prediction learning rule can be a low learning rate, e.g., lower than the learning rate for the user correction learning rule and the sound context learning rule. For example, direct feedback from a user is likely to be more accurate than implicit learning. In other cases, the learning rate for the sound prediction learning rule can be higher than other rules. The learning rates for the various learning rules can vary for different implementations and use cases. In some implementations, the learning rates for the learning rules can be the same. The neuromorphic processor 123 can process the sound prediction learning rule continuously.

Figure 6:
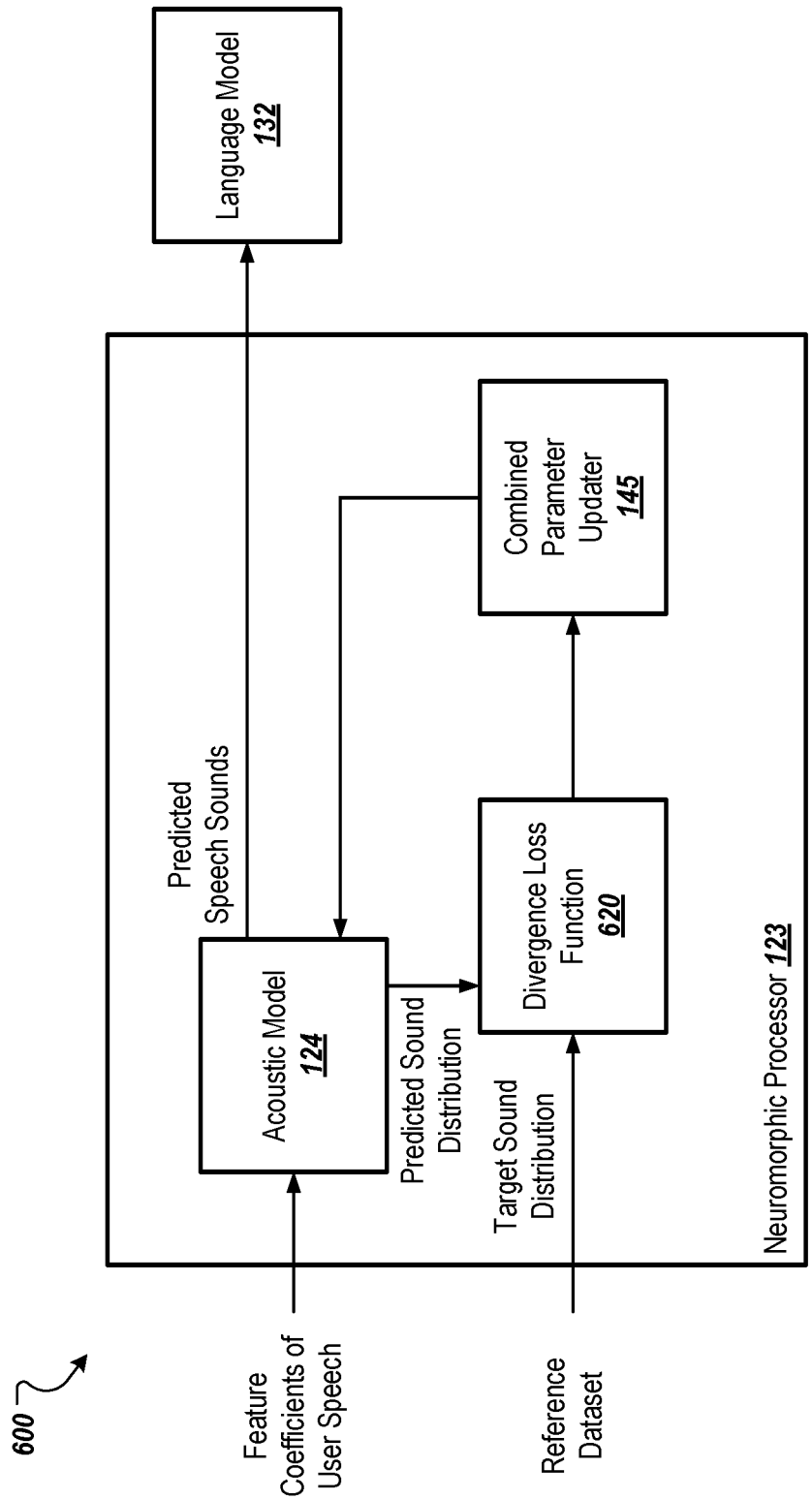
FIG. 6 depicts an example data flow of an example process for updating a self-learning acoustic model using a sound distribution learning rule.

FIG. 6 depicts an example data flow of an example process 600 for updating a self-learning acoustic model using a sound distribution learning rule. The example process 400 can be performed by the neuromorphic processor 123 in combination with components of the cloud platform 130 of FIG. 1.

The sound distribution learning rule minimizes or at least reduces the difference between the observed distribution of speech sounds observed by the speech processing engine 120, e.g., the distribution of speech sounds of the user(s) of the client device 110, and the distribution of speech sounds in a reference dataset. The distribution of speech sounds can be a frequency distribution. The reference dataset can be the same dataset of pre-recorded labeled training data used to initially train the acoustic model 124 or another appropriate dataset that includes a distribution of speech sounds of a group of users, e.g., a group of users that speak a same language and/or dialect as the user(s) of the client device 110 and/or that have a same or similar accent at the user(s) of the client device 110.

The sound distribution learning rule can measure (or receive data indicating the measurements) the relative frequency of phonemes or other units of sound from the user(s) of the client device 110 based on the predicted speech sounds output by the acoustic model 124. The sound distribution learning rule can cause an increase or a decrease in the sensitivity of the acoustic model 124 to those phonemes based on the relative frequencies by adjusting the parameters of the acoustic model 124 when the frequencies of the phonemes diverge from average phoneme frequencies in the reference dataset. For example, if the frequency at which the user(s) of the client device 110 exceeds the frequency of use of the phoneme in the reference dataset by at least a threshold, the sound distribution learning rule can cause the neuromorphic processor 123 to adjust parameters of the acoustic model 124 to increase the sensitivity of the acoustic model 124 in detecting that phoneme. For example, the sensitivity can be increased by increasing the input weight of a neuron for detecting the phoneme to cause the neuron to spike more easily. Similarly, if the frequency at which the user(s) of the client device 110 is below the frequency of use of the phoneme in the reference dataset by at least a threshold, the sound distribution learning rule can cause the neuromorphic processor 123 to adjust parameters of the acoustic model 124 to reduce the sensitivity of the acoustic model 124 in detecting that phoneme. For example, the sensitivity can be decreased by decreasing the input weight of a neuron for detecting the phoneme to make it more difficult for the neuron to spike.

The sound distribution learning rule can also measure (or receive data indicating the measurements) the relative frequency of phoneme-to-phoneme transitions and update the sensitivities of the acoustic model 124 to phonemes conditioned on the prior detected phoneme. For example, if the frequency at which the user(s) of the client device 110 transition from a first phoneme to a second phoneme is higher than the frequency at which users in the reference dataset transitioned from the first phoneme to the second phoneme, the sound distribution learning rule can cause the neuromorphic processor 123 to increase the sensitivity of the acoustic model 124 to detect the second phoneme after detecting the first phoneme by adjusting the parameters of the acoustic model 124. Similarly, if the frequency at which the user(s) of the client device 110 transition from a first phoneme to a second phoneme is lower than the frequency at which users in the reference dataset transitioned from the first phoneme to the second phoneme, the sound distribution learning rule can cause the neuromorphic processor 123 to reduce the sensitivity of the acoustic model 124 to detect the second phoneme after detecting the first phoneme by adjusting the parameters of the acoustic model 124.

The sound distribution learning rule can also be used for speed of speech and improve the accuracy in recognizing speech when there are irregular pauses, speech impediments, and/or fast speech where each phoneme is not clearly articulated.

In this example, the neuromorphic processor 123 includes a divergence loss function 620 that measures a divergence between a distribution at which the acoustic model predicts phonemes and a frequency at which the phoneme is found in a target sound distribution of a reference dataset, e.g., the pre-recorded labeled training data used to initially train the acoustic model 124. The divergence between the two distributions for a phoneme can represent an error or loss that the divergence loss function 620 can minimize or reduce by adjusting the parameters of the acoustic model 124. The divergence between the two distributions for a phoneme can be the difference in frequency at which the acoustic model 124 detects the phoneme and the frequency at which the phoneme is used in the reference dataset.

In some implementations, the divergence loss function 620 measures, for each phoneme transition between multiple phonemes (e.g., from a first phoneme to a second phoneme then to a third phoneme), a divergence between a distribution at which the phoneme transition is detected by the acoustic model 124 and the distribution at which the phoneme transition is found in the reference dataset. The divergence between the two distributions for a phoneme transition can represent an error or loss that the divergence loss function 620 can minimize by adjusting the parameters of the acoustic model 124. The divergence loss function 620 can use either the divergence for each phoneme and/or the divergence for each phoneme transition to update the parameters of the acoustic model 124.

The neuromorphic processor 123 can generate updated parameters for the acoustic model 124 based on the divergences, e.g., the errors computed using the divergence loss function 520. The neuromorphic processor 123 can provide the updated parameters to the combined parameter updater 145. As described above, the combined parameter updater 145 can combine the parameter updates generated using multiple learning rules and then update the acoustic model 124 using the updated parameters. If only the sound distribution learning rule is used, the neuromorphic processor 123 can update the parameters of the acoustic model 124 using the updated parameters determined based on the divergences computed using the divergence loss function 620.

The neuromorphic processor 123 can be configured to update the parameters using the sound distribution learning rule based on a learning rate for the sound distribution learning rule. The learning rate for the sound distribution learning rule can also be a low learning rate, e.g., lower than the learning rate for the other learning rules. The neuromorphic processor 123 can process the sound distribution learning rule continuously.

Figure 7:
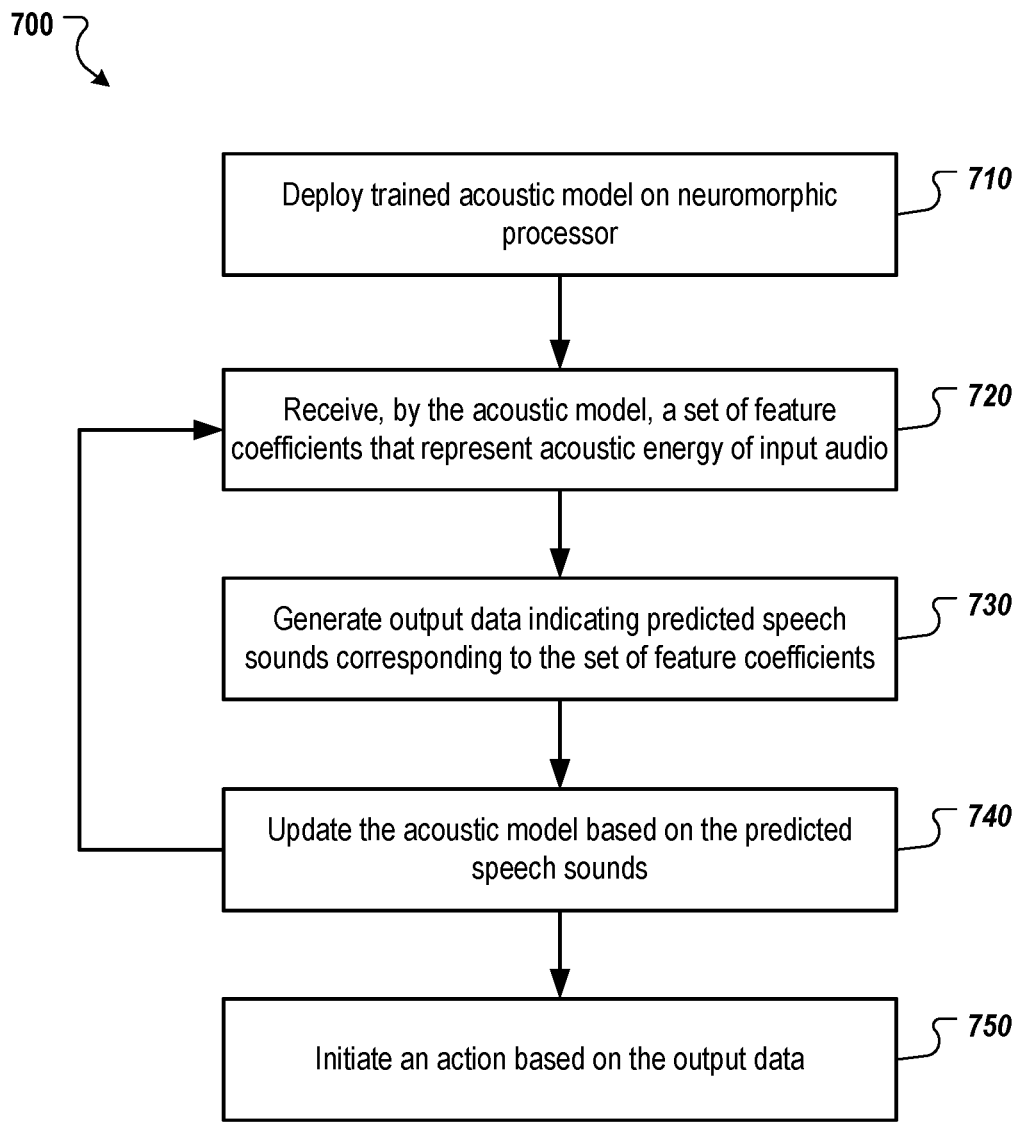
FIG. 7 is a flow diagram of an example process for updating a self-learning acoustic model running on a neuromorphic processor.

FIG. 7 is a flow diagram of an example process 700 for updating a self-learning acoustic model running on a neuromorphic processor. The example process 700 can be performed by the neuromorphic processor 123 of FIG. 1. The neuromorphic processor 123 can perform the process 700, e.g., continuously, to adapt the acoustic model to more accurately recognize speech sounds uttered by a user of a client device on which the acoustic model is deployed.

A trained acoustic model is deployed on a neuromorphic processor (710). In some implementations, a cloud-based platform or one or more servers having, or not having, neuromorphic processors can perform the initial training of the acoustic model, e.g., using the process 200 of FIG. 2. For example, the initial training can be performed on a neuromorphic or another type of machine learning platform. The cloud-based platform or server(s) can then send data representing the initial trained acoustic model to a client device that has a neuromorphic processor installed thereon. The neuromorphic processor can configure a SNN of the neuromorphic processor to match those of the initial trained acoustic model.

The acoustic model receives a set of feature coefficients that represent acoustic energy of input audio (720). For example, raw audio input can be captured by a microphone communicably coupled to the client device. An audio processing module can process the raw audio and generate the feature coefficients based on the processed audio, as described above with reference to FIG. 1. In some implementations, the feature coefficients can be encoded into spikes for processing by the neuromorphic processor.

The acoustic model generates output data indicating predicted speech sounds corresponding to the set of feature coefficients that represent the input audio received from the microphone (730). As described above, the acoustic model can be implemented as a SNN running on the neuromorphic processor. The acoustic model can be configured to receive feature coefficients for input audio and output predicted speech sounds, e.g., predicted phonemes, that correspond to the input audio based on the feature coefficients.

The neuromorphic processor updates one or more parameters of the acoustic model using a combination of one or more learning rules and the predicted speech sounds of the output data (740). For example, the neuromorphic processor can use any combination of the learning rules described in this document to update the parameters of the acoustic model.

The neuromorphic processor can use the learning rules to update the parameters of the acoustic model continuously and/or in real-time at the client device without any additional training being performed off of the client device. For example, no weights or gradients have to be exchanged with the cloud platform to update the acoustic model.

The neuromorphic processor can continue updating the acoustic model continuously and/or for each speech recognition event. For example, the process 700 can return to operation 720 at which additional feature coefficients are received and repeat operations 720-740 for the new audio input corresponding to the additional feature coefficients.

An action is initiated based on the output data (750). For example, the client device or another device (e.g., of a cloud-based platform) can use a language model and a dialogue manager to recognize a command spoken by the user and cause an action corresponding to the command to be performed. In a particular example, the command can be for a smart speaker that includes the acoustic model to play a particular song. In response to recognizing the command, the smart speaker can play the particular song. The dialogue manager 133 can determine what text should be converted to speech by the Text-to Speech Module 134 to inform the user of the action taken.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array), an ASIC (application specific integrated circuit), a neuromorphic research chip, such as Intel's Loihi chip, or a neural network processor, such as BrainChip's Akida™ chip. The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit) a neuromorphic research chip, such as Intel's Loihi chip, or a neural network processor, such as BrainChip's Akida™ chip.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for recognizing speech, the method comprising:

receiving, a trained acoustic model implemented as a spiking neural network (SNN) on a neuromorphic processor of a client device, a set of feature coefficients that represent acoustic energy of input audio received from a microphone communicably coupled to the client device, wherein the acoustic model is trained to predict speech sounds based on input feature coefficients;

generating, by the acoustic model, output data indicating predicted speech sounds corresponding to the set of feature coefficients that represent the input audio received from the microphone;

updating, by the neuromorphic processor, one or more parameters of the acoustic model using one or more learning rules and the predicted speech sounds of the output data, wherein at least one learning rule is configured to update parameters of the acoustic model based on each speech recognition event for which the acoustic model generates a prediction of speech sounds; and initiating an action based on the output data.

2. The method of claim 1, wherein initiating the action comprises sending the output data to a cloud-based platform comprising a lexicon that is trained to output predicted words or phrases based on the predicted speech sounds, which are input into a language model trained to output predicted sentences or phrases, wherein the cloud-based platform determines the action based on the predicted sentences or phrases and causes the action to be performed.

3. The method of claim 1, wherein at least one of the one or more learning rules is configured to update the parameters of the acoustic model continuously and/or in real-time.

4. The method of claim 1, wherein the one or more learning rules comprise a user correction learning rule configured to update the parameters of the acoustic model based on an error between the predicted speech sounds and corrected speech sounds corresponding to a user correction of words or phrases output based on the predicted speech sounds.

5. The method of claim 1, wherein the one or more learning rules comprise a sound context learning rule configured to reduce a difference between predicted speech sounds output the acoustic model and an inferred class of the predicted speech sounds based on context.

6. The method of claim 1, wherein the one or more learning rules comprise a sound prediction learning rule configured to reduce an error between a prediction of upcoming speech sounds to be generated by the acoustic model and corresponding future predicted speech sounds output by the acoustic model.

7. The method of claim 1, wherein the one or more learning rules comprise a sound distribution learning rule configured to reduce a difference between an observed distribution of speech sounds predicted by the acoustic model and a distribution of speech sounds in a reference dataset.

8. The method of claim 1, further comprising receiving an initial trained version of the acoustic model from a cloud-based platform and configuring the SNN based on the initial trained version of the acoustic model.

9. The method of claim 1, wherein initiating the action comprises providing the output data to a lexicon that is trained to output predicted words or phrases based on the predicted speech sounds, which are input into a language model trained to output predicted sentences or phrases wherein the client device determines the action based on the predicted sentences or phrases and causes the action to be performed.

10. A system comprising:
one or more processors including a neuromorphic processor; and
one or more storage devices storing instructions that, when executed by the one or more processors, cause the one or more processors to perform operations comprising:
receiving, a trained acoustic model implemented as a spiking neural network (SNN) on the neuromorphic processor, a set of feature coefficients that represent acoustic energy of input audio received from the microphone, wherein the acoustic model is trained to predict speech sounds based on input feature coefficients;
generating, by the acoustic model, output data indicating predicted speech sounds corresponding to the set of feature coefficients that represent the input audio received from the microphone;
updating one or more parameters of the acoustic model using one or more learning rules and the predicted speech sounds of the output data, wherein at least one learning rule is configured to update parameters of the acoustic model based on each speech recognition event for which the acoustic model generates a prediction of speech sounds; and
initiating an action based on the output data.

11. The system of claim 10, wherein initiating the action comprises sending the output data to a cloud-based platform comprising a lexicon that is trained to output predicted words or phrases based on the predicted speech sounds, which are input into a language model trained to output predicted sentences or phrases, wherein the cloud-based platform determines the action based on the predicted sentences or phrases and causes the action to be performed.

12. The system of claim 10, wherein at least one of the one or more learning rules is configured to update the parameters of the acoustic model continuously and/or in real-time.

13. The system of claim 10, wherein the one or more learning rules comprise a user correction learning rule configured to update the parameters of the acoustic model based on an error between the predicted speech sounds and corrected speech sounds corresponding to a user correction of words or phrases output based on the predicted speech sounds.

14. The system of claim 10, wherein the one or more learning rules comprise a sound context learning rule configured to reduce a difference between predicted speech sounds output the acoustic model and an inferred class of the predicted speech sounds based on context.

15. The system of claim 10, wherein the one or more learning rules comprise a sound prediction learning rule configured to reduce an error between a prediction of upcoming speech sounds to be generated by the acoustic model and corresponding future predicted speech sounds output by the acoustic model.

16. The system of claim 10, wherein the one or more learning rules comprise a sound distribution learning rule configured to reduce a difference between an observed distribution of speech sounds predicted by the acoustic model and a distribution of speech sounds in a reference dataset.

17. The system of claim 10, wherein the operations comprise receiving an initial trained version of the acoustic model from a cloud-based platform and configuring the SNN based on the initial trained version of the acoustic model.

18. The system of claim 10, wherein initiating the action comprises providing the output data to a lexicon that is trained to output predicted words or phrases based on the predicted speech sounds, which are input into a language model trained to output predicted sentences or phrases wherein the client device determines the action based on the predicted sentences or phrases and causes the action to be performed.

19. A non-transitory computer readable medium storing instructions that, when executed by one or more processors including a neuromorphic processor, cause the one or more processors to perform operations comprising:
receiving, a trained acoustic model implemented as a spiking neural network (SNN) on the neuromorphic processor, a set of feature coefficients that represent acoustic energy of input audio received from the microphone, wherein the acoustic model is trained to predict speech sounds based on input feature coefficients;
generating, by the acoustic model, output data indicating predicted speech sounds corresponding to the set of feature coefficients that represent the input audio received from the microphone;
updating one or more parameters of the acoustic model using one or more learning rules and the predicted speech sounds of the output data, wherein at least one learning rule is configured to update parameters of the acoustic model based on each speech recognition event for which the acoustic model generates a prediction of speech sounds; and
initiating an action based on the output data.

20. The non-transitory computer readable medium of claim 19, wherein initiating the action comprises sending the output data to a cloud-based platform comprising a lexicon that is trained to output predicted words or phrases based on the predicted speech sounds, which are input into a language model trained to output predicted sentences or phrases, wherein the cloud-based platform determines the action based on the predicted sentences or phrases and causes the action to be performed.

* * * * *